UNITED STATES PATENT OFFICE.

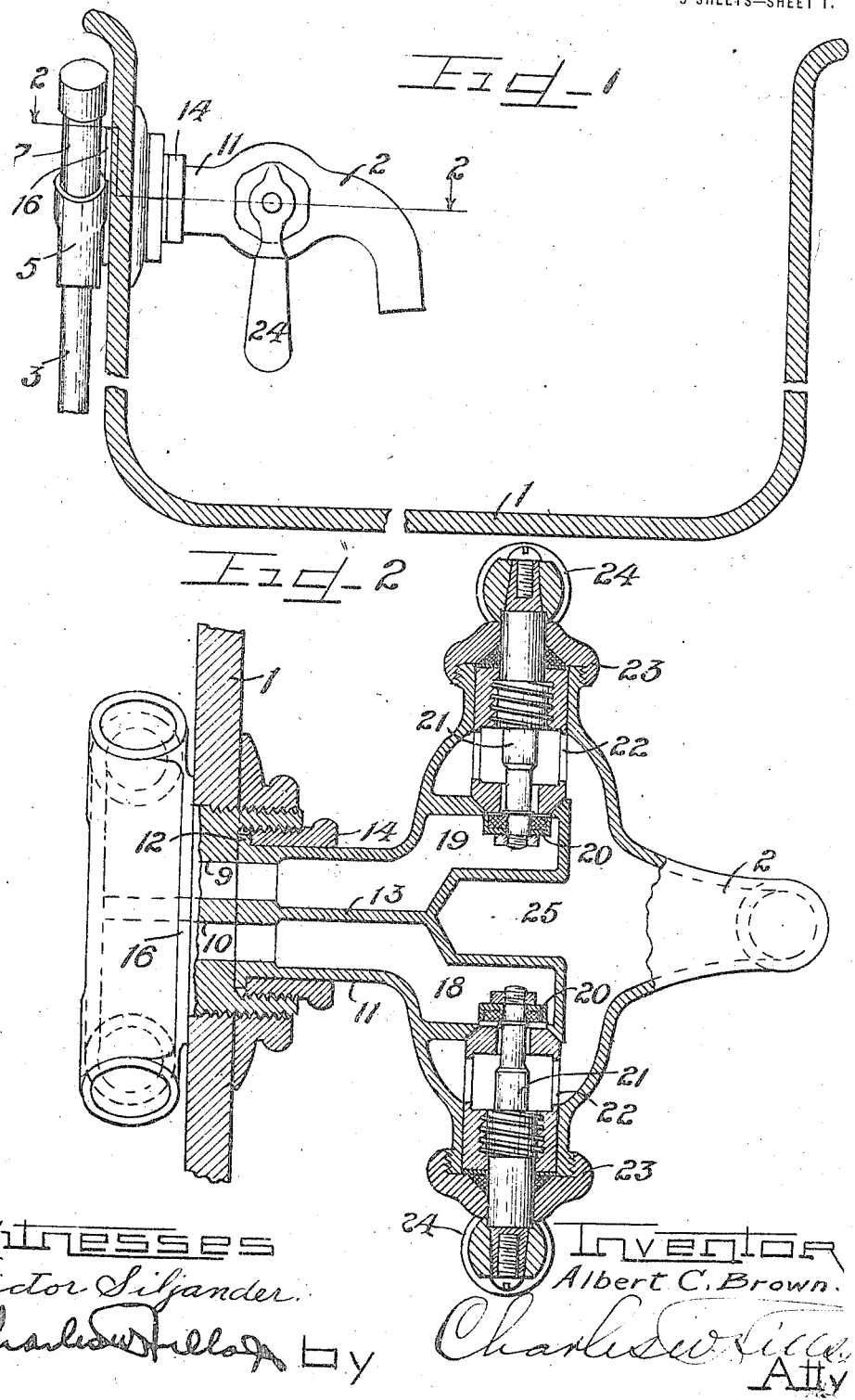

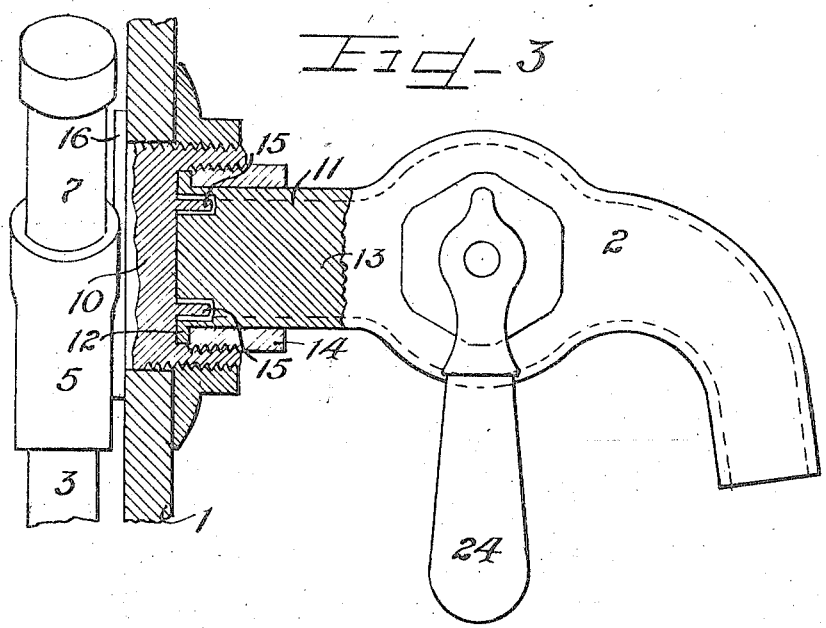
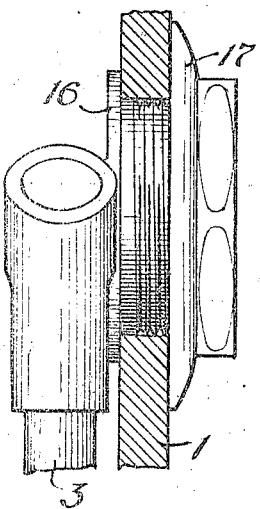
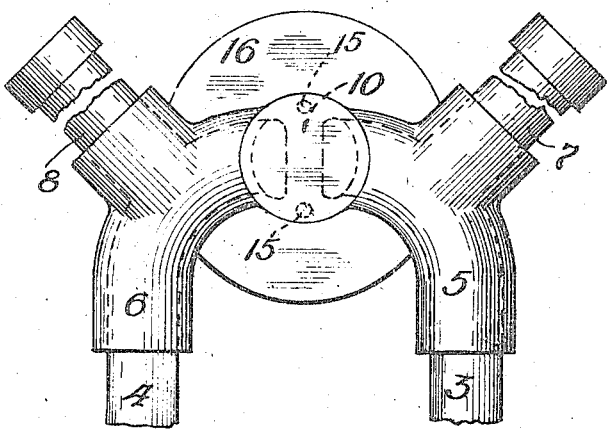

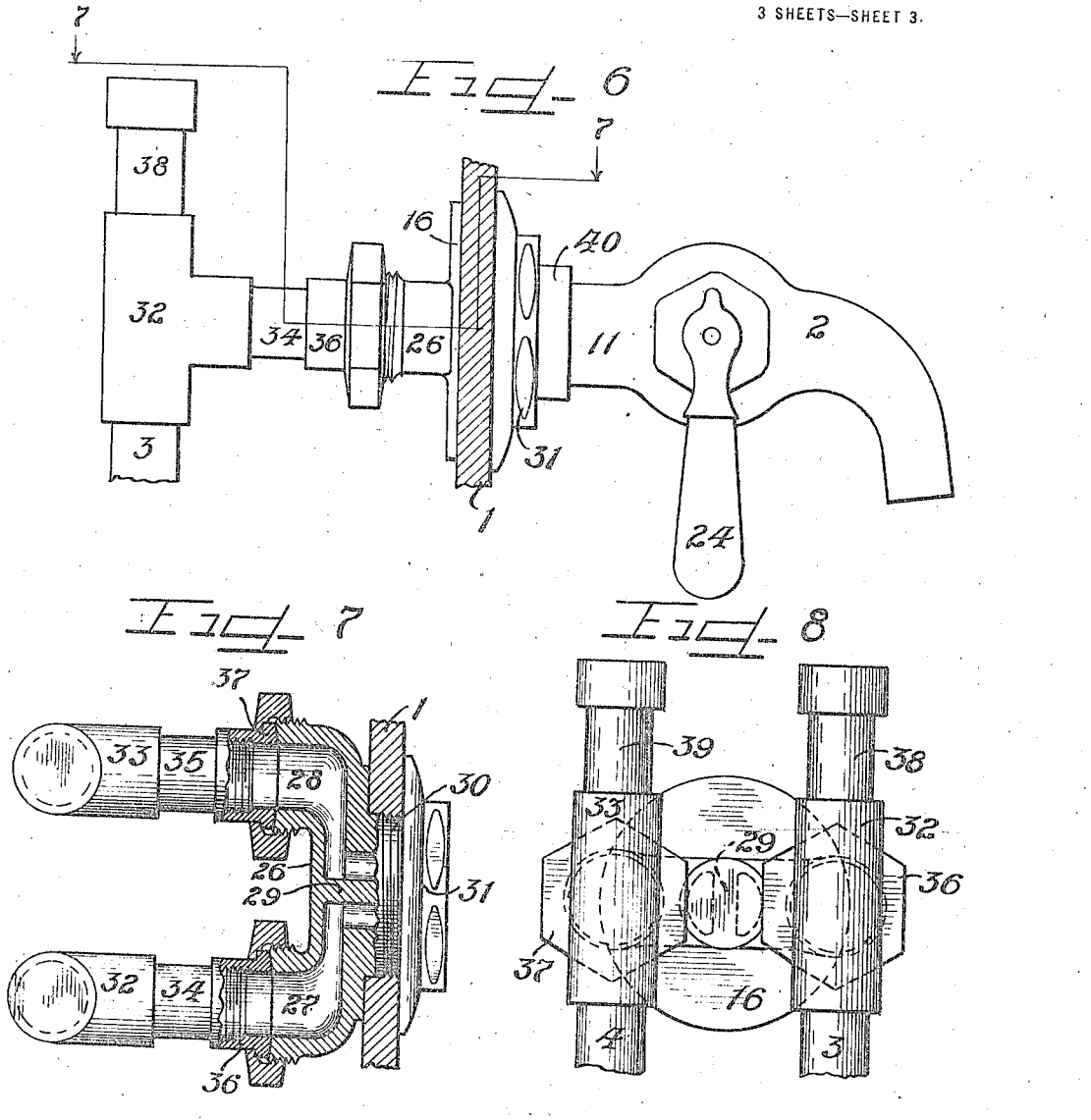

ALBERT C. BROWN, OF CHICAGO, ILLINOIS.

ATTACHING MEANS FOR FAUCETS.

1,180,824.

Specification of Letters Patent.

Patented Apr. 25, 1916.

Application filed March 9, 1914. Serial No. 823,319.

*To all whom it may concern:*

Be it known that I, ALBERT C. BROWN, a citizen of the United States, and a resident of the city of Chicago, in the county of Cook and State of Illinois, have invented certain new and useful Improvements in Attaching Means for Faucets; and I do hereby declare that the following is a full, clear, and exact description of the same, reference being had to the accompanying drawings, and to the numerals of reference marked thereon, which form a part of this specification.

Plumbers have frequently experienced great difficulty and loss of time in properly attaching faucets in sinks or wash bowls, and other places where such are used, and connecting the same to the fluid supply.

This invention has for its object to provide a fitting whereby a faucet may be readily attached to the water supply lines, obviating the difficulty generally encountered where different types of faucets are used.

It is an object of this invention to provide a fitting for the attachment of faucets to supply lines, wherein faucets of different construction may be readily used and mounted substantially interchangeably with one another without interfering in any way with the supply lines.

It is also an object of this invention to provide attaching means for faucets whereby a single spout faucet capable of delivering either hot or cold water or both may be connected into the respective hot and cold water supply lines without complicated fittings and in a manner to permit ready removal therefrom.

It is also an object of this invention to provide a fitting for connecting a faucet to the supply line for a sink or wash bowl, whereby the faucet is adjustably held in the fitting and the fitting is capable of adjustment to take care of different conditions of attachment.

It is furthermore an object of this invention to construct a double supply faucet attaching means readily connected to the respective hot and cold water supply lines, and permitting releaseable engagement of a faucet thereto.

It is finally an object of this invention to construct a device simple in operation, durable in construction, and neat in appearance.

The invention (in a preferred form) is illustrated in the drawings and hereinafter more fully described.

In the drawings: Figure 1 is a section through a sink or wash bowl, illustrating a faucet attached to the water supply lines by means of a device embodying the principles of my invention. Fig. 2 is a section on line 2—2 of Fig. 1, with parts in elevation. Fig. 3 is an enlarged view similar to Fig. 1, shown partly in section to illustrate the construction. Fig. 4 is a rear elevation of the faucet attaching means. Fig. 5 is an edge view thereof, with part of the sink to which it is attached shown in section. Fig. 6 is a side elevation of a modification of my device shown attached to a bowl or sink shown in section. Fig. 7 is a section on line 7—7 of Fig. 6, with parts in elevation. Fig. 8 is a rear elevation of a modified form.

As shown in the drawings, the reference numeral 1, indicates a sink, which is apertured on one side thereof to receive a fitting therethrough, whereby a faucet, denoted as a whole by the reference numeral 2, may be attached to the respective hot and cold water supply lines, indicated by the reference numerals 3, and 4, respectively.

The particular fitting which comprises my invention consists of the casting with entrance pipes 5, and 6, disposed in U-form and each provided with an air cushion chamber, comprising short lengths of pipe 7, and 8, respectively, closed by a cap threaded on the end thereof. Said entrance pipes 5, and 6, communicate in the circular exteriorly threaded pipe portion 9, which is provided with a central partition 10, adapted to maintain the respective hot and cold water separated in their flow therethrough.

In the particular embodiment of my invention herein set forth I have shown the attaching means as supporting a single spout double flow faucet. As clearly shown in Figs. 2, and 3, the shank 11, of said faucet is provided with an outwardly turned flange 12, and a central partition 13, the flanged portion projecting into the doubly passaged portion 9, with the partitions 10, and 13, in register with one another. Said pipe portion 9, is also internally threaded to receive the gland member 14, which is rotatably mounted on the shank of the faucet, and which bears against said flange 12, on the faucet body to hold the same within the fitting. To prevent relative movement of the faucet, the central partition 10, of the fitting is provided with outwardly projecting pins or lugs 15, and at corresponding points in the partition 13, in the faucet body, recesses are provided to receive said lugs therein. Also formed integral with the attaching fitting and extending outwardly from the pipe portion 9, is a relatively wide flange 16, which, when the fitting is connected to a sink, contacts the outer or rear surface thereof. A nut or collar 17, is threaded on the pipe portion 9, on the opposite surface or interior of the sink, to draw the fitting closely into contact therewith, and insuring a firm connection therebetween. As already stated, the faucet shown in this connection is adapted to permit a flow of either hot or cold water or both, and embodies the respective hot and cold water chambers 18, and 19, within the casing, each respectively controlled by a valve closure 20, opening against the pressure. Said closures are actuatable by a rotatable valve stem 21, which has threaded connection with a sleeve 22, held in the casing by a union nut 23, at one end, and bearing at its other against the inclined edge of an aperture in the wall of the respective water chamber to which it is connected. Actuating handles 24, are provided on the ends of said respective stems to operate the same. Upon opening either one of the valve closures, a supply of water is allowed to flow into the chamber 25, from which it is admitted to the sink or wash bowl through the spout.

In the modification illustrated in Figs. 6 to 8 inclusive, I have shown a construction which may be connected by suitable couplings to the risers of hot and cold water supply lines. This construction embodies a casing 26, which, as before, is chambered to afford the supply passages 27, and 28, for the hot and cold water respectively, and is, as before, provided with a central partition, in this case denoted by the reference numeral 29. Likewise a pipe portion 30, is adapted to extend through an aperture in the sink or wash bowl 1, and the device is held clamped thereto by means of a threaded nut or collar 31. In this construction, however, T's 32, and 33, are connected on the respective hot and cold water risers and short lengths of pipe 34, and 35, connect the respective T's 32, and 33, with the respective pipe couplings, denoted as a whole by the reference numerals 36, and 37, respectively, which in turn are attached to the entrance passages 27, and 28, of the fitting. Short lengths of pipe 38, and 39, respectively, are threaded into the upper end of said T's, and are closed by caps to afford an air cushion therein. In Fig. 6, a double flow faucet similar to the one already described is shown connected to the modified form of my device, and of course a gland member 40, threads within the pipe portion 30, to maintain the faucet in proper position on the fitting.

The operation is as follows: When it is desired to attach a faucet to a sink or bowl and also to the water supply line, the supply lines in one case being threaded into the entrance passages 5, and 6, of the fitting, and with the nut 12, and gland 14, removed, the pipe portion 9, is inserted through an aperture in the bowl or sink and with the flange 16, bearing closely against the outer surface thereof. The fitting is then set up tightly against the bowl by threading the nut 12, upon said pipe portion, until the nut is jammed tightly against the inner surface of the sink. After the fitting is connected to the supply line and also upon the sink, the faucet is attached by means of the gland 14, which is rotatably mounted on the shank of the faucet, and which threads into the internally threaded portion of the pipe portion 9, of the fitting, thus jamming the faucet tightly into place and affording a firm support therefor.

In the modified form shown in Figs. 6 to 8 inclusive, the fitting 26, is connected to the respective T's 32, and 33, of the hot and cold water supply lines by ordinary pipe couplings, and short pipe lengths 34, and 35, respectively, and said fitting is then set up in place upon the sink, as before, by means of the nut 31, after which the faucet is inserted and held therein by means of the gland 40, as before.

I am aware that various details of construction may be varied through a wide range without departing from the principles of this invention. I therefore do not purpose limiting the patent granted otherwise than necessitated by the prior art.

I claim as my invention:

1. An attaching device for faucets embracing entrance supply pipes, air cushion chambers connected therewith, means to abut against the wall of a sink to which the device is to be attached, an adjustable member coöperating with said means to clamp the device tightly upon the wall of the sink, and a gland member engaged on the shank of a faucet and threaded into the device.

2. In a device of the class described an entrance supply passage, a flange connected thereon to abut against the wall of a sink to which the device is attached, an externally threaded pipe portion projecting through an aperture in said sink, a collar adapted to be threaded on said pipe portion to clamp the fitting tightly upon the wall of the sink, and a gland member threading internally into said pipe member and rotatably engaged on the shank of a faucet to hold the same in proper register in said device.

3. In a device of the class described an externally threaded pipe portion insertible through an aperture in the wall of a sink, a flange integral therewith adapted to contact one surface of the sink wall, a nut threaded on said pipe portion to clamp the same on the other surface of said sink wall, entrance supply pipes communicating with said pipe portion, and a gland threaded into said pipe portion, adapted to retain a double flow faucet in proper register and in firm position thereon.

4. In a device of the class described the combination with a double flow faucet for hot and cold water, of a doubly passaged connecting fitting comprising a pipe portion, a central partition therein, means for clamping the fitting upon the wall of a sink, a gland rotatable on the faucet adapted to be threaded into said pipe portion to maintain said faucet in proper position thereon, and lugs on said partition co-acting with recesses in said faucet member to assist in properly positioning the faucet.

5. In a device of the class described the combination with a double flow faucet, of a hollow attaching fitting, a partition therein affording a plurality of entrance supply passages, fixed means adapted to engage one surface of the wall of a sink, adjustable means to clamp said fitting thereto from the other surface of said wall, and interfitting means on the partition in said fitting, and a partition in said faucet to properly position the faucet and fitting relative one another.

6. In a device of the class described a doubly passaged fitting connected to sources of water supply, a partition therein, means clamping the fitting on the wall of a sink, means releasably securing a faucet to said fitting, and co-acting means on said faucet and fitting to insure proper register thereof when connected to one another.

In testimony whereof I have hereunto subscribed my name in the presence of two subscribing witnesses.

ALBERT C. BROWN.

Witnesses:
CHARLES W. HILLS, Jr.,
FRANK K. HUDSON.